US009599017B2

United States Patent
Joshi et al.

(10) Patent No.: US 9,599,017 B2
(45) Date of Patent: Mar. 21, 2017

(54) GAS TURBINE ENGINE AND METHOD OF OPERATING THEREOF

(71) Applicant: General Electric Company, Schenectady, NY (US)

(72) Inventors: Narendra Digamber Joshi, Schenectady, NY (US); Joel Meier Haynes, Schenectady, NY (US); Venkat Eswarlu Tangirala, Nlskayuna, NY (US); Christian Lee Vandervort, Voorheesville, NY (US)

(73) Assignee: General Electric Company, Niskayuna, NY (US)

( * ) Notice: Subject to any disclaimer, the term of this patent is extended or adjusted under 35 U.S.C. 154(b) by 731 days.

(21) Appl. No.: 13/930,122

(22) Filed: Jun. 28, 2013

(65) Prior Publication Data

US 2015/0000290 A1    Jan. 1, 2015

(51) Int. Cl.
*F01K 23/10* (2006.01)
*F02C 3/34* (2006.01)
(Continued)

(52) U.S. Cl.
CPC .............. *F02C 3/30* (2013.01); *F01K 23/10* (2013.01); *F02C 3/34* (2013.01); *F02C 6/003* (2013.01);
(Continued)

(58) Field of Classification Search
CPC ....... F23R 2900/03341; F05D 2260/61; F01K 23/10; F02C 3/34
See application file for complete search history.

(56) References Cited

U.S. PATENT DOCUMENTS 4,529,358 A * 7/1985 Papell ..................... F01D 5/186
                                                     415/115
5,339,634 A    8/1994 Gale et al.
(Continued)

OTHER PUBLICATIONS

William Paul Minnear et al.; "Hydrocarbon Film Protected Refractory Carbide Components and Use"; Pending U.S. Appl. No. 13/328,704, filed Dec. 16, 2011, 21 Pages.

*Primary Examiner* — Phutthiwat Wongwian
*Assistant Examiner* — William Breazeal
(74) *Attorney, Agent, or Firm* — Robert M. McCarthy

(57) ABSTRACT

A turbine system and method of operating is provided. The system includes a compressor configured to generate a compressed low-oxygen air stream and a combustor configured to receive the compressed low-oxygen air stream and to combust a fuel stream to generate a post combustion gas stream. The turbine system also includes a turbine for receiving the post combustion gas stream to generate a low-$NO_x$ exhaust gas stream, a heat recovery system configured to receive the low-$NO_x$ exhaust gas stream and generate a cooled air stream and an auxiliary compressor configured to generate an oxygen and water vapor deficient cooled and compressed air stream. A portion of the oxygen and water vapor deficient cooled and compressed air stream is directed to the combustor to generate an Oxygen and $H_2O$ deficient film on exposed portions of the combustor, and another portion is directed to the turbine to provide a cooling flow.

16 Claims, 5 Drawing Sheets

(51) Int. Cl.
  *F02C 3/30*   (2006.01)
  *F02C 6/00*   (2006.01)
  *F02C 7/16*   (2006.01)
  *F02C 9/18*   (2006.01)
  *F23R 3/34*   (2006.01)

(52) U.S. Cl.
  CPC .............. *F02C 7/16* (2013.01); *F02C 9/18* (2013.01); *F23R 3/34* (2013.01); *F05D 2260/61* (2013.01); *F23R 2900/03341* (2013.01); *Y02E 20/16* (2013.01)

(56) References Cited

U.S. PATENT DOCUMENTS

| | | |
|---|---|---|
| RE35,061 E | 10/1995 | Correa |
| 8,375,723 B2 | 2/2013 | Benz et al. |
| 2006/0272331 A1* | 12/2006 | Bucker ................. C01B 3/386 60/774 |
| 2009/0218821 A1* | 9/2009 | ElKady ................. F01K 23/10 290/52 |

\* cited by examiner

GAS TURBINE ENGINE AND METHOD OF OPERATING THEREOF

BACKGROUND

The disclosure relates generally to gas turbines systems, and in particular, to a rich burn combustor for a gas turbine engine.

Hydrocarbon fuel burning processes are widely used in stationary power-generating gas-turbine systems. Combustion by-products which pollute the atmosphere are required to be minimized as part of a growing concern about the quality of the earth's atmosphere. Therefore, combustors for stationary power-generating gas-turbine systems are required to produce low levels of nitric oxides (NO, $NO_2$, $N_2O$, etc., collectively referred to as $NO_x$) and of carbon monoxide (CO). Such emissions may lead to acid rain and other environmental problems. The $NO_x$ can result from reactions with atmospheric nitrogen, such reactions being referred to as "thermal" and "prompt" $NO_x$, or with fuel-bound nitrogen (FBN). According to well-supported combustion theory, $NO_x$ produced by the "thermal" mechanism is due to atmospheric nitrogen being fixed by the radicals responsible for flame initiation and propagation.

The preponderance of thermal $NO_x$ in conventional (fuel and air not premixed) combustors, due to the high temperatures in the turbulent mixing interfaces, has led to water or steam injection for $NO_x$ control. In this approach, the injected water or steam absorbs heat, reduces the peak temperatures (to below the $NO_x$ forming threshold) and so reduces $NO_x$ emission levels. The lower temperatures have the undesirable side effect of quenching CO consumption reactions and so the CO levels increase and combustor life and efficiency are reduced. Thus the water or steam injection technique is not ideal for $NO_x$ control.

Powerplant constraints dictate that a stability, turn-down ratio (i.e. power changes corresponding to power demand reductions) and efficiency be similar to those of current equipment. $NO_x$ control techniques without water or steam injection are referred to as "dry" combustion. Two dry low-$NO_x$ combustion techniques have been suggested: (i) rich-lean staged combustion (originally intended for thermal and FBN $NO_x$ control but not successful for the reasons discussed below); and (ii) lean premixed combustion (intended for thermal $NO_x$ control).

In rich-lean staged combustion, the combustor is divided into a first zone which is rich (equivalence ratio $\Phi \cong 1.3$-$1.8$; note that $\Phi=1$ for stoichiometric conditions, $\Phi>1$ being rich and $\Phi<1$ being lean) and a second zone which is lean. Because of the off-stoichiometric conditions, temperatures in each zone are too low for $NO_x$ (e.g. less than 2780° F.) to form via the "thermal" mechanism.

However in prior art staged systems, the mixing of air with the efflux of the rich zone occurs at finite rates and cannot prevent the formation of hot near-stoichiometric eddies. The attendant high temperatures lead to the copious production of thermal $NO_x$, which is triggered at temperatures above about 2780° F. This has been the experience both in the laboratory and in mainframe (100 MW class) gas-turbine equipment. However, rich combustors are suitable for fuels with significant fuel-bound nitrogen content because the amount of oxygen available to produce FBN $NO_x$ is limited.

Lean premixed combustors, which are useful if the fuel does not contain nitrogen, are fueled by a lean (prevaporized, if liquid fuel) premixed fuel-air stream at $\Phi \cong 0.7$. The ensuing temperatures are uniformly too low (e.g., less than 2780° F.) to activate the thermal $NO_x$ mechanism. This forms a lower limit to the minimum $NO_x$ obtainable in current hydrocarbon-fueled combustors.

A conventional gas turbine engine includes a compressor for compressing air (sometime referred to as an oxidant as the air has oxidizing potential due to the presence of oxygen), which is mixed with fuel in a combustor and the mixture is combusted to generate a high pressure, high temperature gas stream, referred to as a post combustion gas. The post combustion gas is expanded in a turbine (high pressure turbine), which converts thermal energy from the post combustion gas to mechanical energy that rotates a turbine shaft.

During the process of combustion in a rich combustor, the fuel is consumed in an oxygen deficient environment at relatively low temperature. The high temperature discharge from the combustor may be allowed to expand through a high pressure turbine extracting work from the flow. This work extraction results in a significant cooling of the flow. This fuel rich flow can then be mixed with additional air to consume the unburned fuel in the rich flow stream in a second combustor, and more particularly in a lean combustor. The second burning takes place at a significantly (for thermal $NO_x$ formation) lower temperatures. The hot air flow from the second combustor is allowed to expand in downstream turbines extracting additional work. In this type of configuration, the production of $NO_x$ is minimized due to the relatively cool temperatures in the rich and lean burning cycles, which temperatures are below the established level for the production of thermal $NO_x$. Prompt $NO_x$ is also minimized since CO in the lean cycles tends to be negligible. FBN $NO_x$ is minimized because the rich combustor runs with too little oxygen for production of $NO_x$. Additional information regarding this low $NO_x$ process of combustion is described in commonly assigned, U.S. Pat. No. RE35,061, issued to Sanjay M. Correa, entitled "Dry Low $NO_x$ Hydrocarbon Combustion Apparatus," which is incorporated by reference herein in its entirety.

By incorporating a secondary lean burn combustor, the post combustion gas is re-combusted after mixing with additional oxygen from the compressor. The re-combusted post combustion gas is expanded in another turbine section (low pressure turbine) to generate additional power. The deployment of the lean combustor and the low pressure turbine therefore utilizes the oxidizing potential of the post combustion gas, thereby increasing the efficiency of the engine.

In an attempt to further increase gas turbine efficiency and specific work, an increase in pressure ratio and firing temperatures may result. This increase in pressure ratio and firing temperatures requires the use of high temperature materials, such as silicon carbide (SiC) in the gas turbine engine. During high temperature operation (in excess of 4000° F.), durability issues exist with regard to chemical attacks of the SiC composite hardware, including but not limited to, combustor liners, domes and turbine blades, by oxygen (O) atoms, hydrogen ($H_2$), hydroxide (OH) radicals and water ($H_2O$) molecules. Environmental barrier coatings may be employed to minimize these chemical attacks, such as water vapor attacks on the SiC components. These coating materials provide satisfactory protection to the SiC components as long as they are not damaged, such as by scratching, or the like, or degraded. Accordingly, during high temperature operation the increase in firing temperature is limited by material capabilities and the $NO_x$ emissions.

Accordingly, it is desired to provide for an improved gas turbine engine, capable of operating at increased temperatures.

BRIEF DESCRIPTION

These and other shortcomings of the prior art are addressed by the present disclosure, which provides a gas turbine engine and method for operating a gas turbine engine.

One aspect of the present disclosure resides in a turbine system comprising: a compressor configured to generate a compressed low-oxygen air stream; a combustor configured to receive the compressed low-oxygen air stream from the compressor and to combust a fuel stream to generate a post combustion gas stream; a turbine for receiving the post combustion gas stream from the combustor to generate power and a low-$NO_x$ exhaust gas stream; a heat recovery system configured to receive the low-$NO_x$ exhaust gas stream from the turbine for generation of a cooled gas stream; and an auxiliary compressor configured to receive at least a portion of the cooled gas stream from the heat recovery system for generation of an oxygen and water vapor deficient cooled and compressed gas stream. A portion of the oxygen and water vapor deficient cooled and compressed gas stream is directed to the combustor to generate an oxygen and $H_2O$ deficient film on exposed portions of the combustor. In addition, a portion of the oxygen and water vapor deficient cooled and compressed gas stream is directed to the turbine to provide a cooling flow.

Another aspect of the present disclosure resides in a turbine system comprising: a compressor configured to compress ambient air and at least a portion of a low-$NO_x$ exhaust gas stream to form a compressed low-oxygen air stream; a combustor configured to receive the compressed low-oxygen air stream from the compressor, and to combust a fuel stream in a rich-quench-lean (RQL) mode of combustion to generate a post combustion gas stream; a turbine for receiving the post combustion gas stream from the combustor to generate electricity and the low-NOx exhaust gas stream; a heat recovery system configured to receive a portion of the low-$NO_x$ exhaust gas stream from the turbine for generation of a cooled gas stream; and an auxiliary compressor configured to receive at least a portion of the cooled gas stream from the heat recovery system for generation of an oxygen and water vapor deficient cooled and compressed gas stream. A portion of the oxygen and water vapor deficient cooled and compressed gas stream is directed to the combustor to generate an oxygen and $H_2O$ deficient film on exposed portions of the combustor. In addition, a portion of the oxygen and water vapor deficient cooled and compressed gas stream is directed to the turbine to provide a cooling flow.

Yet another aspect of the disclosure resides in a method for operating a turbine system comprising: producing a compressed low-oxygen air stream in a compressor; combusting the compressed low-oxygen air stream with a fuel stream in a combustor to form an post combustion gas; expanding the post combustion gas in a turbine to generate a low-$NO_x$ exhaust gas; cooling the a low-$NO_x$ exhaust gas in a heat recovery system to generate a cooled gas stream; compressing a portion of the cooled gas stream in an auxiliary compressor to form an oxygen and water vapor deficient cooled and compressed gas stream; injecting the oxygen and water vapor deficient cooled and compressed gas stream into the combustor and turbine to provide a cooling flow; and recirculating another portion of the cooled air stream to an inlet of the compressor to generate the compressed low-oxygen air stream.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

Figure 1:
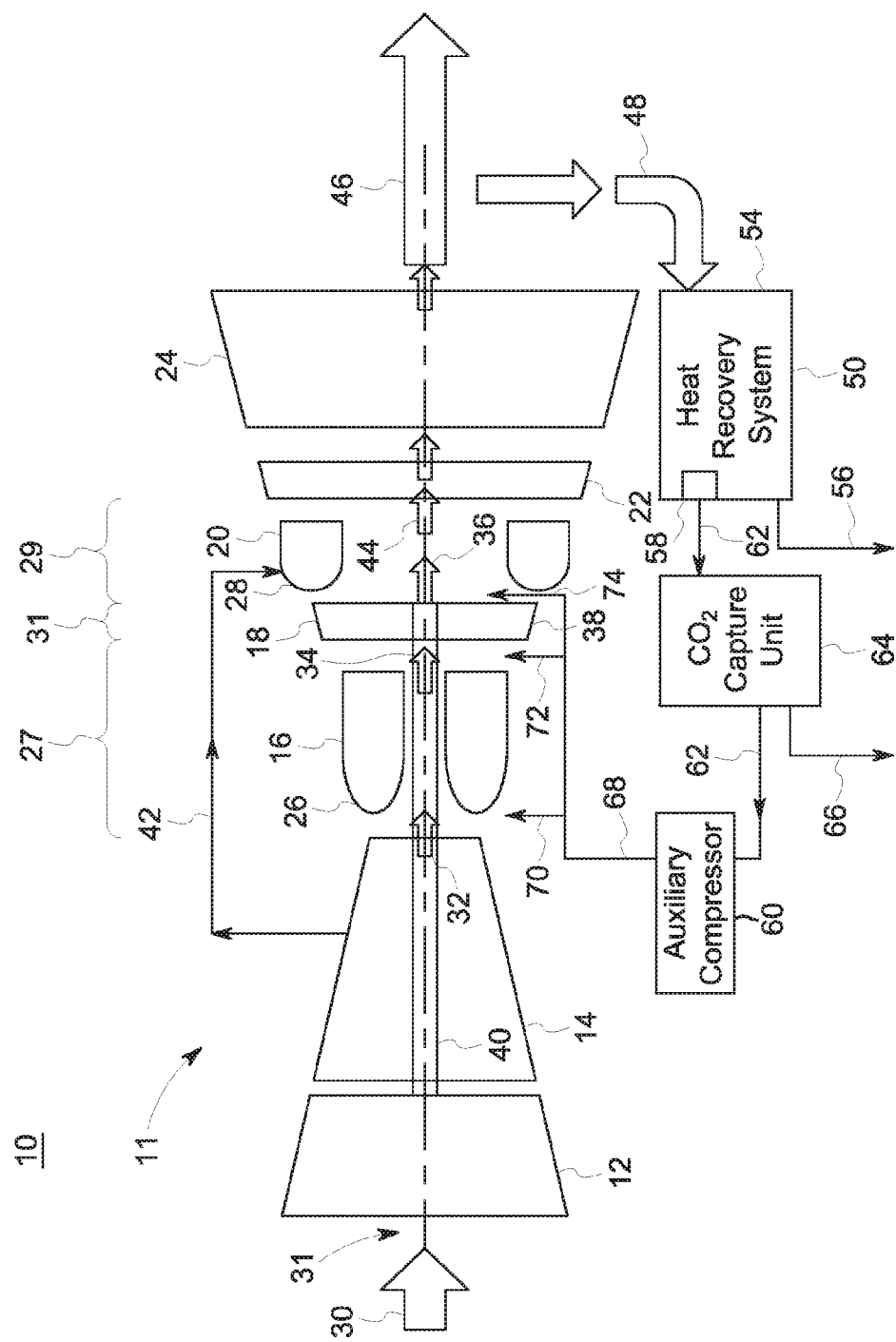
FIG. 1 schematically illustrates a gas turbine system in accordance with one or more embodiments shown or described herein.

The disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the terms "first", "second", or the like are intended for the purpose of orienting the reader as to specific components parts.

Moreover, in this specification, the suffix "(s)" is usually intended to include both the singular and the plural of the term that it modifies, thereby including one or more of that term (e.g., "the jets" may include one or more jets, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

As discussed in detail below, embodiments of the present disclosure provide a gas turbine system including a rich burn combustor and method for operating the rich burn combustor of a gas turbine system that addresses the needs of higher temperature capable ceramic materials as well as emissions capabilities. This disclosure may, however, be embodied in many different forms and should not be construed as limited to the embodiments set forth herein; rather these embodiments are provided so that this disclosure will be thorough and complete and will fully convey the scope of the disclosure to those skilled in the art.

As discussed in detail below, embodiments of the present system and method function to reduce emissions in turbine systems, and to provide combustion technologies to enhance overall efficiency of the turbine systems, while reducing $NO_x$ formation. In some of the specific embodiments, the present technique includes employing exhaust gas recirculation (EGR), along with a rich-quench-lean (RQL) mode of combustion to minimize emissions such as $NO_x$.

Referring now to FIG. 1, illustrated is a gas turbine system 10, and in particular a gas turbine engine 11, in accordance with an embodiment of the disclosure. FIG. 1 illustrates in flow communication, a low pressure compressor 12, a high pressure compressor 14, a first combustor 16, a first turbine 18, a second combustor 20, a second turbine 22 and a power turbine 24. In an embodiment, the first combustor 16 is a rich burn combustor 26, defining a rich zone 27 and the second combustor 18 is a lean burn combustor 28 defining a lean zone 29, and wherein a quench zone 31 is formed therebetween. The rich zone 27 is configured to allow fuel-rich combustion of a fuel stream (described presently). The quench zone 31 is configured to allow conversion of the fuel-rich combustion to a fuel-lean combustion of the fuel stream. The lean zone 29 is configured to allow the fuel-lean combustion of the fuel stream.

An air stream 30 comprising atmospheric air is fed into the low pressure compressor 12 and the high pressure compressor 14 at an inlet 31, for compression to the desired temperature and pressure. In an alternate embodiment, described presently, in addition to the air stream 30, a portion of a low-NOx exhaust gas stream may be recirculated to the inlet 31 of the compressor 12. After compression, the air stream 30 exits the high pressure compressor 14 as a hot burning, fuel rich, compressed low-oxygen air stream 32 and is mixed with a fuel stream (not shown) in the first combustor 16, and more particularly in the rich burn combustor 26. The mixture is ignited (combusted) in the rich burn combustor 26 resulting in a high temperature, high pressure stream of a post combustion gas stream 34.

100% of the fuel is applied to the first combustor 16 which burns that fuel in a rich combustion mixture with a relatively low mount of air supplied via the compressors 12 and 14. In this exemplary embodiment, the air stream 30 is compressed using the low pressure compressor 12 and the high pressure compressor 14 and is directed to the combustor 16 for combusting the fuel stream to generate the low-NOx high pressure stream of a post combustion gas 34. In particular, combustion of the compressed low-oxygen air stream 32 facilitates reduction in flame temperature thereby resulting in $NO_x$ reduction. In addition, combustion of the fuel stream with the compressed low-oxygen air stream 32 enables fuel-rich combustion leading to further $NO_x$ reduction.

As used herein, the term "fuel-rich combustion" refers to combustion of the fuel stream and the compressed low-oxygen air stream 32, wherein an equivalence ratio (ER) or a fuel-to-oxidizer ratio is approximately 2.5-3. For example, the amount of air supplied to the first combustor 16 may be 10% of the air supplied to the second combustor 20 from the compressor 12 and 14, via a conduit 42. The combustion products are applied to the second combustor 20 while at a relatively hot temperature, but below about 2780° F. at which thermal $NO_x$ is generated. Because of the rich combustion, little oxygen is available for the combustion process in combustor 20 and the temperature thereof does not exceed the threshold temperature at which thermal $NO_x$ is generated. The relatively rich characteristics of the burning process generate little O, OH and other oxidizing radicals in the burning process minimizing prompt $NO_x$. Also, the rich combustion process favors reforming chemistry, i.e. tends to avoid the generation of hydrocarbon (CH) gas products; instead produces gas products comprising primarily CO and $H_2$. The CO and $H_2$ mixture is commonly referred to as syngas or synthetic gas. The FBN species, if present, are converted to $N_2$ (molecular nitrogen).

The post combustion gas stream 34 is expanded in the first turbine 18 to convert thermal energy associated with the post combustion gas stream 34 into mechanical energy and exits the first turbine 18 as an expanded combustion gas stream 36. The first turbine 18 is configured to expand the post combustion gas stream 34, to drive an external load such as a generator, or the like (not shown) to generate electricity. In the illustrated embodiment, the low pressure compressor 12 and/or the high pressure compressor 14 are driven by the power generated by the first turbine 18 via a shaft 40. In a specific embodiment, the first turbine 18 is a high pressure turbine 38.

The expanded combustion gas stream 36 is associated with certain amount of unutilized heated oxygen (about 15% to about 18% by mass). Therefore, instead of releasing the expanded combustion gas stream 36 into the atmosphere, the gas turbine system 10 deploys the second combustor 20 and the second turbine 22 to generate additional power. This work extraction results in a significant cooling of the expanded combustion gas stream 36.

The cooled fuel-rich flow, and more particularly the cooled expanded combustion gas 36 is next mixed with the additional compressed air, via the conduit 42, to consume the unburned fuel in the rich flow stream in the second combustor 20, and more particularly, the lean combustor 28. The second burning takes place in the lean combustor 28 at a significantly (for thermal $NO_x$ formation) lower temperature. The hot air flow from the second combustor 20, in the form of a post combustion gas stream 44, is allowed to expand in the one or more downstream turbines 22 and 24, exiting as an expanded low-$NO_x$ exhaust gas stream 46 and providing for the extraction of additional work. In one exemplary embodiment, the low-$NO_x$ exhaust gas stream 46 contains a $NO_x$ level of less than about 30 ppm. In certain embodiments, the low-$NO_x$ exhaust gas stream 36 contains a $NO_x$ level of less than about 5 ppm. Thus, in the disclosed embodiment, heat addition takes place in both the first combustor 16 and the second combustor 18 at lower temperatures inhibiting the formation of $NO_x$ while allowing very high thermal efficiencies.

In a second aspect of the system, a portion 48 of the fully expanded low-$NO_x$ exhaust gas stream 46 is directed to a heat recovery system 50 and an auxiliary compressor 60. The temperature of the portion 48 of the fully expanded low-NOx exhaust gas stream 46 is further decreased in the heat recovery system 50. In an embodiment, the heat recovery system is a heat recovery steam generator (HRSG) 54, configured to receive the fully expanded low-$NO_x$ exhaust gas stream 46 from the power turbine 24 for generation of steam 56 and a cooled gas stream 62. The gas turbine system 10 may include an additional turbine (not shown), such as a steam turbine, to generate additional electricity via a generator (not shown), using the steam 56 from the HRSG 50. In the illustrated embodiment, the gas turbine system 10 may further include an exhaust gas recirculation (EGR) valve 58 to control a flow of the cooled gas stream 62 of the exhaust gas 46 from the HRSG 50 to the auxiliary compressor 60 and a carbon dioxide ($CO_2$) capture unit 64 providing a $CO_2$ stream 66.

The cooled gas stream 62 is compressed in the auxiliary compressor 60 to appropriate conditions for use in the rich burn combustor 26. More specifically, the cooled gas stream 62 is compressed in the auxiliary compressor 60 to generate an oxygen and water vapor deficient cooled and compressed gas stream 68. As illustrated, the cooled pressurized portion of the exhaust stream 46, is injected as the oxygen and water vapor deficient cooled and compressed gas stream 68 into the rich burn combustor 26, as a cool compressed airflow 70, and into the turbine 18 as a forward cavity purge flow 72 and an aft cavity purge flow 74. Due to the fact that most of the oxygen is utilized in the combustion process, this cooled and compressed portion of the exhaust stream 46 is oxygen depleted and dry (no moisture). Accordingly, the oxygen and water vapor deficient cooled and compressed gas stream 68 is utilized to form an inert film (described presently) to protect the combustors 16 and/or 20 and turbine 18 components from attack by oxygen and water vapor in the air. This reduces the need for environmental barrier coatings on the high temperature components, such as the previously mentioned SiC components.

Figure 2:
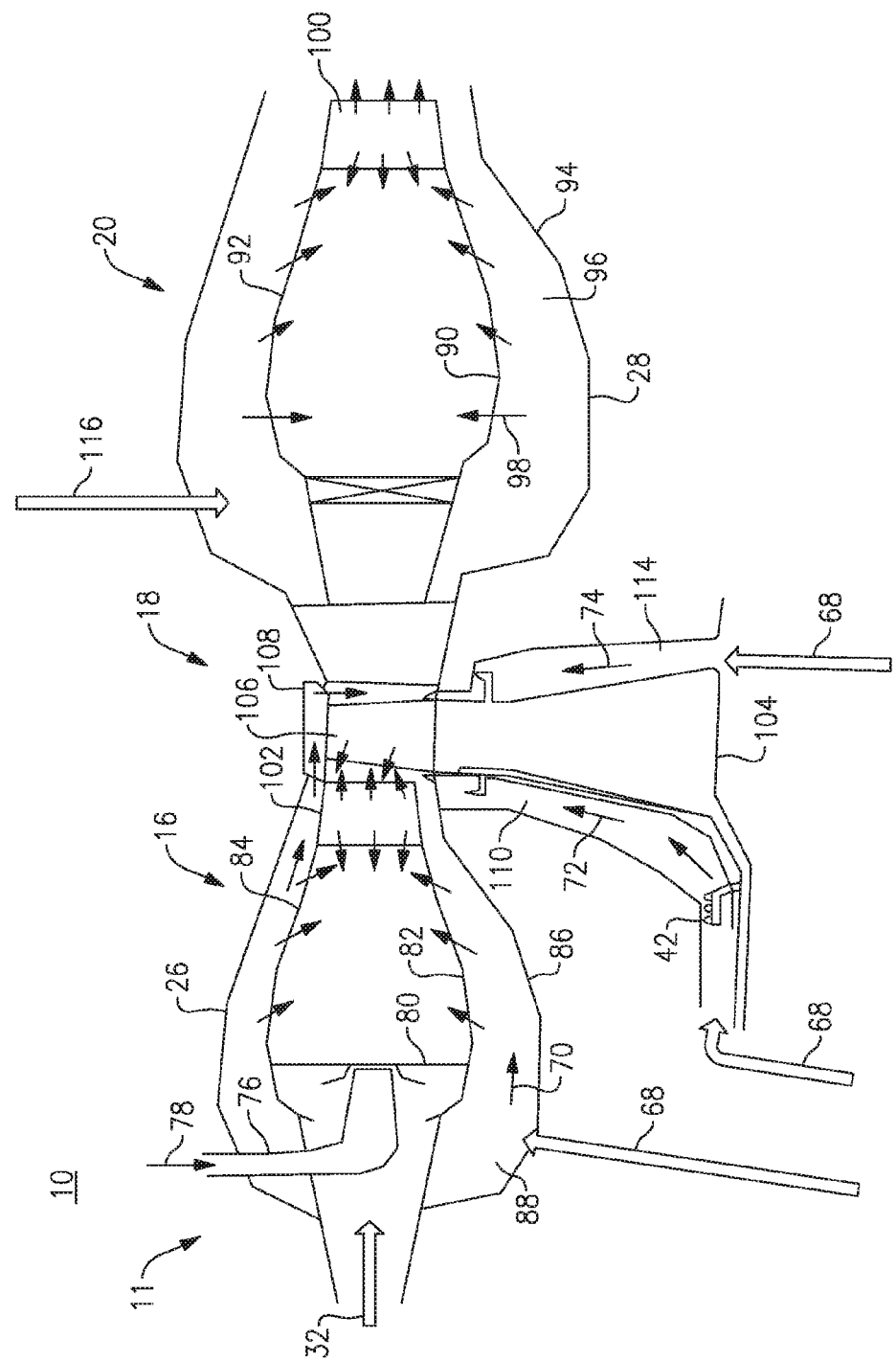
FIG. 2 schematically illustrates an exemplary configuration of a portion of the gas turbine system of FIG. 1, in accordance with one or more embodiments shown or described herein.

Referring more specifically to FIG. 2, illustrated is a portion of the gas turbine system 10 of FIG. 1, illustrating in greater detail the first combustor 16, and more specifically the rich burn combustor 26, the second combustor 20, and more particularly the lean burn combustor 28 and the recirculation of the exhaust flow, and more particularly the low-$NO_x$ exhaust gas stream 46, therethrough. As illustrated, the first combustor 16 includes a fuel nozzle 76 in flow communication with the combustor 16 and providing for the input of a fuel 78. The combustor 18 further includes a dome 80, a combustor inner liner 82, a combustor outer liner 84, and a combustor shell 86, having a combustor cavity 88 defined therebetween the combustor shell 86 and the outer liner 84. During combustion, the low-oxygen air stream 32 is combusted with the fuel stream 78 in a rich burn, quick-mix, lean burn (RQL) mode of combustion within the combustors 16 and 20.

As illustrated, the second combustor 20 includes a combustor inner liner 90, a combustor outer liner 92, and a combustor shell 94, having a combustor cavity 96 defined therebetween the combustor shell 94 and the outer liner 92. Further included are one or more dilution air jets 98 and a turbine nozzle 100 in flow communication with the downstream second turbine 22 (FIG. 1).

Disposed between the first combustor 16 and the second combustor 20 is the first turbine 18, as previously described with regard to FIG. 1. In an embodiment, the first turbine 18 is in flow communication with the first combustor 16 via a nozzle 102. The first turbine 18 further includes a turbine rotor 104, one or more turbine blades 106, and an outer turbine shroud 108. Further included are a forward cooling flow cavity 110 including a labyrinth seal 112 disposed therein, and an aft cavity purge cavity 114.

As previously indicated, the gas turbine system 10 is configured to provide exhaust gas recirculation, thus reducing the need for environmental barrier coatings on the high temperature SiC components, such as the previously mentioned combustion liners 82, 84, 90, 92, the dome 80 and turbine blades 106. As illustrated, the previously mentioned oxygen and water vapor deficient cooled and compressed gas stream 68 (FIG. 1) provides the cool compressed airflows 70 to the rich burn combustor 26, and the forward cavity purge flow 72 and the aft cavity purge flow 74 to the turbine 18. Further illustrated is an input of the compressed low-oxygen air stream 32, previously described, and an input of an additional airflow stream 116 to the lean combustor 28 via the conduit 42 (FIG. 1).

The cooled compressed exhaust flow, and more particularly the cool compressed airflow 70, comprised of the oxygen and water vapor deficient cooled and compressed gas stream 68, is utilized to lay down an oxygen and $H_2O$ deficient film 118 on the exposed portions of the combustor liner, and more particularly the inner liners 82, 90 and nozzle parts 100, 102.

Figure 3:
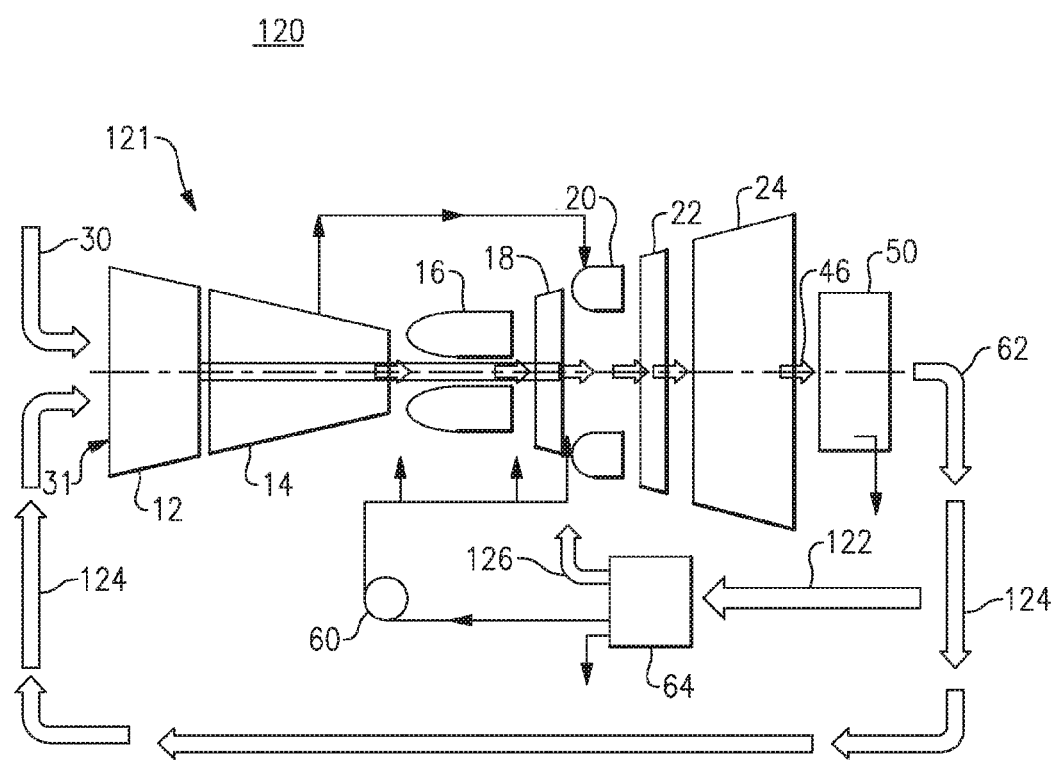
FIG. 3 schematically illustrates an alternate embodiment of a gas turbine system in accordance with one or more embodiments shown or described herein.
Figure 4:
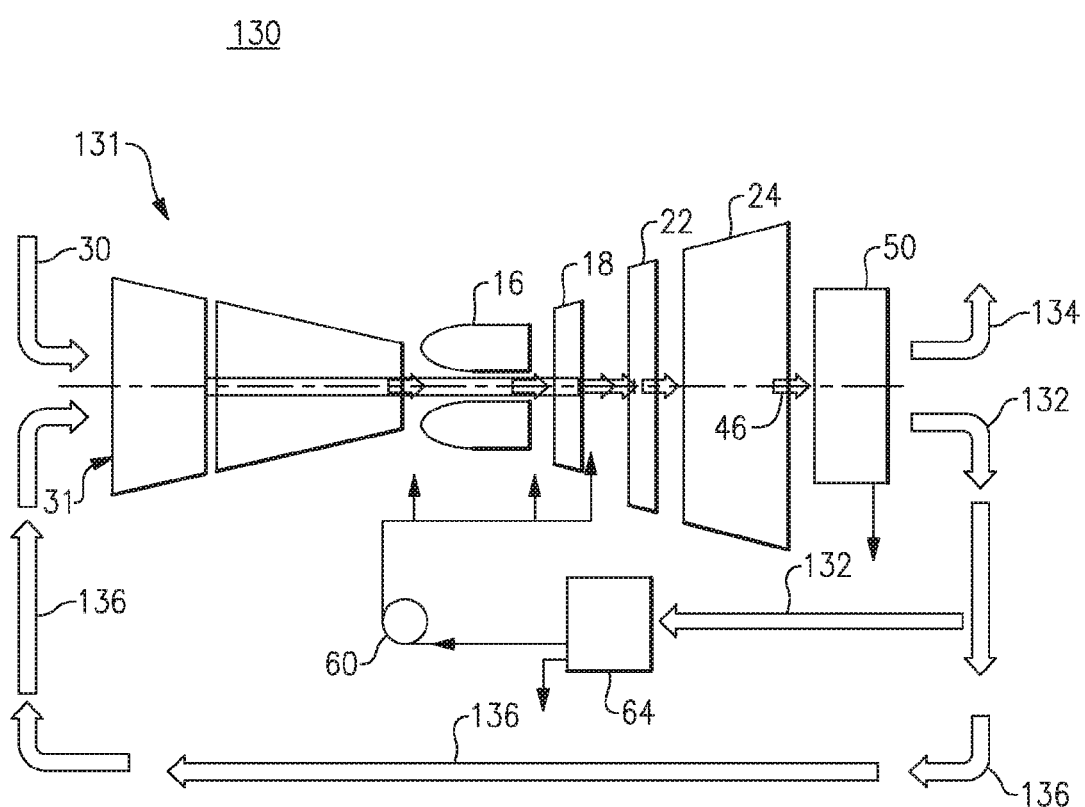
FIG. 4 schematically illustrates an alternate embodiment of a gas turbine system in accordance with one or more embodiments shown or described herein.

Referring now to FIGS. 3 and 4, illustrated are alternate embodiments of a gas turbine system according to the disclosure, wherein like have like numbers throughout the embodiment. Illustrated in FIG. 3 is a gas turbine system 120, and in particular a gas turbine engine 121, including a low pressure compressor 12, a high pressure compressor 14, a first combustor 16, a first turbine 18, a second combustor 20, a second turbine 22 and a power turbine 24. Illustrated in FIG. 4 is a gas turbine system 130, and in particular a gas turbine engine 131, including a low pressure compressor 12, a high pressure compressor 14, a combustor 16, a first turbine 18, a second turbine 22 and a power turbine 24. As in the embodiment of FIG. 1, previously described, the combustor 16 is a rich burn combustor 26 and the second combustor 18 (FIG. 3) is a lean burn combustor 28. Further included in each of the systems 120 and 130 is a heat recovery system 50 and an auxiliary compressor 60. The system 120 of FIG. 3 further includes a $CO_2$ capture unit 64, as previously described.

As illustrated in the embodiment of FIG. 3, the low-NOx exhaust gas stream 46, after initial cooling in the heat recovery system 50 to generate the cooled gas stream 62, is split with a first portion 122 directed toward the $CO_2$ capture unit 64 and the auxiliary compressor 60, for cooling of the combustor 16 and turbine 18 as previously described. A second portion 124 of the low-NOx exhaust gas stream 46 is recirculated into the inlet 31 of the gas turbine system 120, along with air stream 30 (FIG. 1). During recirculation of the first portion 122 of the low-NOx exhaust gas stream 46, a portion 126 of the cooled gas stream 62 exiting the $CO_2$ capture unit 64 is exhausted to the atmosphere.

As illustrated in an alternate embodiment of FIG. 4, the low-NOx exhaust gas stream 46, after initial cooling in the heat recovery system 50 to generate the cooled gas stream 62, is split with a first portion 132 directed toward the $CO_2$ capture unit 64 and the auxiliary compressor 60, for cooling of the combustor 16 and turbine 18 as previously described, a second portion 134 exhausted to the atmosphere, and a third portion 136 recirculated into the inlet 31 of the gas turbine engine 130, along with air stream 30 (FIG. 1). A flow splitter (not shown) may be employed to split the portions 132, 134 and 136 upon exiting the HRSG 50.

It should be understood, although specific configurations are illustrated for the gas turbine engine as disclosed herein, this disclosure may, however, be embodied in many different forms and should not be construed as limited to the embodiments set forth herein; rather these embodiments are provided so that this disclosure will be thorough and complete and will fully convey the scope of the disclosure to those skilled in the art. In addition, it is to be understood that the described inventive features may be combined in any suitable manner in the various embodiments and configurations.

The disclosed engine configurations provide redirection of a portion of the exhaust flow, and more particularly the low-$NO_x$ exhaust gas stream 46, which has its oxygen consumed and is now rich in $CO_2$ and $H_2O$ (water vapor) to a heat recovery system 50 where the temperature of the low-$NO_x$ exhaust gas stream 46 is reduced. Reduction in this temperature also results in condensation of water vapor (formed during combustion). The oxygen-lean cooled stream, and more particularly the cooled gas stream 62, is then compressed in the auxiliary compressor 60 to an appropriate pressure. This oxygen and water vapor deficient cooled and compressed gas stream 68 is then used to set up an oxygen and water vapor deficient barrier or film 118 between the hot burning fuel-rich, compressed low-oxygen air stream 32 in the rich combustor 26 and the silicon carbide (SiC) based combustion liners 82, 90, dome 80 and turbine blades 106. This reduces the need for environmental barrier coatings needed to stop water vapor attacks on the SiC hardware. Accordingly, the SiC hardware can operate with a surface temperature up to 3000° F., permitting the turbine inlet temperature of the high pressure turbine 18 to be comfortably exceed 4000° F. The oxygen and water vapor deficient cooled and compressed gas stream 68 is also used to set up a barrier film 118 for the SiC blades 106 on the turbine 18 and to purge forward and aft cavities 110, 114.

Figure 5:
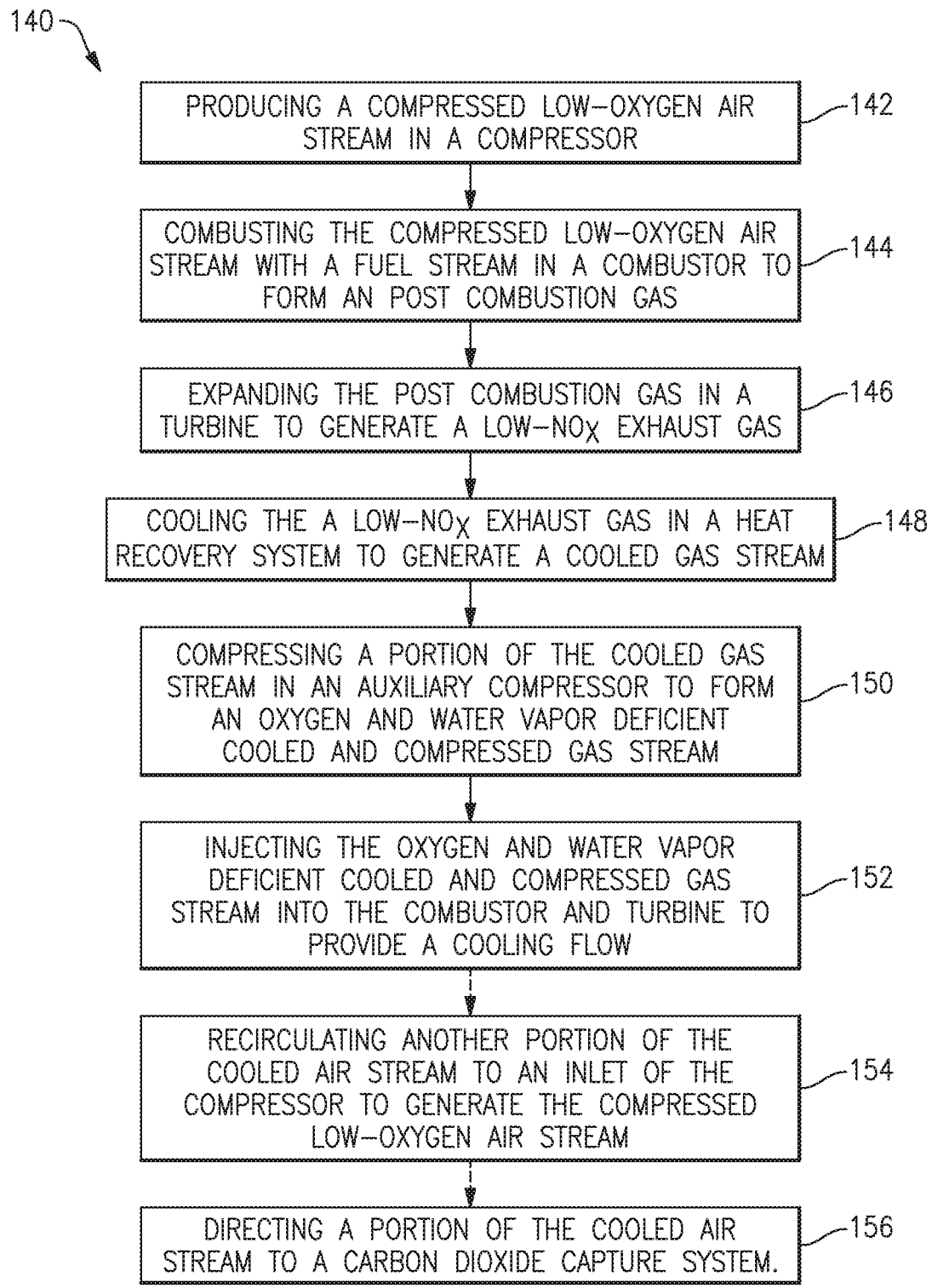
FIG. 5 schematically illustrates a method a method of operating a turbine system in accordance with one or more embodiments shown or described herein.

Referring now to FIG. 5, illustrated is a method 140 of operating a turbine system in accordance with an embodiment disclose herein. In a first step, 142, a compressed low-oxygen air stream is produced in a compressor. The compressed low-oxygen air stream is combusted with a fuel stream in a combustor to form an post combustion gas, in a step 144. The post combustion gas in a step 146, is expanded in a turbine to generate a low-$NO_x$ exhaust gas. The low-$NO_x$ exhaust gas is next cooled, in a step 148, in a heat recovery system to generate a cooled gas stream. A portion of the cooled gas stream is compressed in an auxiliary compressor to form an oxygen and water vapor deficient cooled and compressed gas stream, in a step 150. The oxygen and water vapor deficient cooled and compressed gas stream is next injected into the combustor and turbine to provide a cooling flow, in a step 152. In an embodiment, another portion of the cooled air stream is recirculated, in a step 154, to an inlet of the compressor to generate the compressed low-oxygen air stream. In an embodiment, a portion of the cooled air stream is directed to a carbon dioxide capture system, in a step 156.

Accordingly, the disclosed combustion system, provides a low $NO_x$ emission gas turbine engine to be designed with a rich and a lean combustor separated by a work extracting high pressure turbine, or alternately a rich turbine followed by a high pressure turbine. Advantageously, the technique of including exhaust gas recirculation in combination with the RQL combustion enables substantial reduction in $NO_x$ formation. It permits low $NO_x$ generation in the combustion system while permitting the firing temperature of the gas turbine engine to exceed 4000° F. The disclosed system addresses existing durability issues with chemical attacks on SiC composite hardware by oxygen (O) atoms, hydrogen (H), Hydroxide ion (OH) radicals and water ($H_2O$) molecules by putting a barrier stream between the hot SiC components and the hot burning gases which is deficient in water vapor and oxygen.

The disclosed configuration will permit the design and deployment of an extremely high thrust/weight gas turbine engine. The thermal efficiency of the core engine is expected to be 3-10 points superior to the state of the art core engines. Similarly, the thrust to weight of this technology is substantially improved.

The various aspects of the system and method described hereinabove have utility in different applications such as carbon capture and sequestration plants, low emissions gas turbines and integrated gasification combined cycle (IGCC) systems. As noted above, the technique employs exhaust gas recirculation and RQL mode of combustion for substantially reducing $NO_x$ formation from such systems. Advantageously, the technique enhances the overall efficiency of the turbine system and carbon capture and sequestration plants, without correspondingly increasing thermal $NO_x$ formation. Further, the technique eliminates the need for additional components, such as a catalytic reactor for reducing $NO_x$ levels in existing turbine systems, thereby reducing the cost of such systems.

Although only certain features of the disclosure have been illustrated and described herein, many modifications and changes will occur to those skilled in the art. It is, therefore, to be understood that the appended claims are intended to cover all such modifications and changes as fall within the true spirit of the disclosure.

What is claimed is:

1. A turbine system, comprising:
   a compressor configured to generate a compressed air stream;
   a combustor configured to receive the compressed air stream from the compressor and to combust a fuel stream to generate a post combustion gas stream;
   a turbine for receiving the post combustion gas stream from the combustor to generate power and an exhaust gas stream containing a $NO_x$ level of less than 30 ppm;
   a heat recovery system configured to receive the exhaust gas stream exiting the turbine for generation of a cooled gas stream exiting the heat recovery system;
   a carbon dioxide ($CO_2$) capture unit configured to receive the cooled gas stream exiting the heat recovery system for $CO_2$ removal and generation of a $CO_2$ stream, a remaining portion of the cooled gas stream exiting the carbon dioxide ($CO_2$) capture unit; and
   an auxiliary compressor configured to receive the cooled gas stream exiting the carbon dioxide ($CO_2$) capture unit for generation of a cooled and compressed gas stream containing less than 13% by volume of oxygen,
   wherein a first portion of the cooled and compressed gas stream exiting the auxiliary compressor is input to the combustor to generate a film on exposed portions of the combustor, and wherein a second portion of the cooled and compressed gas stream is input to the turbine to provide a cooling flow.

2. The turbine system of claim 1, wherein the combustor is a rich burn combustor configured to allow fuel-rich combustion of the fuel stream.

3. The turbine system of claim 1, wherein the heat recovery system is a heat recovery steam generator (HRSG) configured to receive the exhaust gas stream from the turbine for generation of steam and the cooled gas stream.

4. The turbine system of claim 1, further comprising an exhaust gas recirculation valve to control a flow of the cooled gas stream from the heat recovery system to the auxiliary compressor.

5. The turbine system of claim 1, wherein a portion of the exhaust gas stream is recirculated to the compressor to generate the compressed air stream.

6. The turbine system of claim 1, wherein the exhaust gas contains a $NO_x$ level of less than 5 ppm.

7. The turbine system of claim 1, wherein the film is generated on exposed portions of the combustor liner, a combustor dome and turbine purge cavities.

8. A turbine system, comprising:
a compressor configured to compress ambient air and at least a portion of an-exhaust gas stream containing a $NO_x$ level of less than 30 ppm to form a compressed air stream;
a combustor configured to receive the compressed air stream from the compressor, and to combust a fuel stream in a rich-quench-lean (RQL) mode of combustion to generate a post combustion gas stream;
a turbine for receiving the post combustion gas stream from the combustor to generate electricity and the exhaust gas stream;
a heat recovery system configured to receive a portion of the exhaust gas stream from the turbine for generation of a cooled gas stream exiting the heat recovery system;
a carbon dioxide ($CO_2$) capture unit configured to receive the cooled gas stream exiting the heat recovery system for $CO_2$ removal and generation of a $CO_2$ stream, a remaining portion of the cooled gas stream exiting the carbon dioxide ($CO_2$) capture unit; and
an auxiliary compressor configured to receive the cooled gas stream from exiting the heat recovery system carbon dioxide ($CO_2$) capture unit for generation of a cooled and compressed gas stream containing less than 13% by volume of oxygen,
wherein a first portion of the cooled and compressed gas stream is directed to the combustor to generate a film on exposed portions of the combustor, and
wherein a second portion of the cooled and compressed gas stream is directed to the turbine to provide a cooling flow.

9. The turbine system of claim 8, wherein the heat recovery system is a heat recovery steam generator (HRSG) configured to receive the exhaust gas stream from the turbine for generation of steam.

10. The turbine system of claim 8, wherein the combustor comprises:
a rich zone configured to allow fuel-rich combustion of the fuel stream;
a quench zone configured to allow conversion of the fuel-rich combustion to a fuel-lean combustion of the fuel stream; and
a lean zone configured to allow the fuel-lean combustion of the fuel stream.

11. A method of operating a turbine system, comprising:
producing a compressed air stream in a compressor;
combusting the compressed air stream with a fuel stream in a combustor to form a post combustion gas stream;
expanding the post combustion gas stream in a turbine to generate an exhaust gas stream containing a $NO_x$ level of less than 30 ppm;
cooling the exhaust gas stream in a heat recovery system to generate a cooled gas stream exiting the heat recovery system;
removing carbon dioxide ($CO_2$) from the cooled gas stream exiting the heat recovery system in a carbon dioxide ($CO_2$) capture unit and generating a $CO_2$ stream, a remaining portion of the cooled gas stream exiting the carbon dioxide ($CO_2$) capture unit; and
compressing the cooled gas stream exiting the carbon dioxide ($CO_2$) capture unit in an auxiliary compressor to form a cooled and compressed gas stream containing less than 13% by volume of oxygen; and
injecting the cooled and compressed gas stream into the combustor and turbine to provide a cooling flow.

12. The method of claim 11, further comprising, recirculating another portion of the exhaust gas stream to an inlet of the compressor to generate the compressed air stream.

13. The method of claim 11, comprising combusting the compressed air stream in a rich-quench-lean (RQL) mode of combustion.

14. A turbine system, comprising:
a compressor configured to generate a compressed air stream;
a combustor configured to receive the compressed air stream from the compressor and to combust a fuel stream to generate a post combustion gas stream;
a turbine for receiving the post combustion gas stream from the combustor to generate power and an expanded combustion gas stream;
at least one additional combustor configured to receive the expanded combustion gas stream from the turbine and to combust an additional fuel stream to generate an additional post combustion gas stream;
at least one additional turbine for receiving the additional post combustion gas stream from the at least one additional combustor to generate power and an exhaust gas stream containing a $NO_x$ level of less than 30 ppm;
a heat recovery system configured to receive the exhaust gas stream from the at least one additional turbine for generation of a cooled gas stream;
a carbon dioxide ($CO_2$) capture unit configured to receive the cooled gas stream exiting the heat recover system for $CO_2$ removal and generation of a $CO$ stream, a remaining portion of the cooled gas stream exiting the carbon dioxide ($CO_2$) capture unit; and
an auxiliary compressor configured to receive at least a portion of the cooled gas stream from the heat recovery system for generation of a cooled and compressed gas stream containing less than 13% by volume of oxygen,
wherein a first portion of the cooled and compressed gas stream is directed to the combustor to generate film on exposed portions of the combustor, and
wherein a second portion of the cooled and compressed gas stream is directed to the turbine to provide a cooling flow.

15. The turbine system of Claim 14, wherein the at least one additional combustor is a lean burn combustor configured to allow fuel-lean combustion of the additional fuel stream.

16. The turbine system of claim 14, wherein the combustor is configured to combust the fuel stream in a rich-quench-lean (RQL) mode of combustion and the at least one additional combustor is configured to combust the additional fuel stream in a rich-quench-lean (RQL) mode.

* * * * *